(12) United States Patent
Kapadia et al.

(10) Patent No.: US 10,554,544 B2
(45) Date of Patent: Feb. 4, 2020

(54) "SLOW-START" PROBLEM IN DATA CENTER NETWORKS AND A POTENTIAL SOLUTION

(71) Applicant: Cisco Technology, Inc., San Jose, CA (US)

(72) Inventors: Shyam Kapadia, Santa Clara, CA (US); Nilesh Shah, Fremont, CA (US); Bhushan Kanekar, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/444,791

(22) Filed: Feb. 28, 2017

(65) Prior Publication Data

US 2017/0171067 A1    Jun. 15, 2017

Related U.S. Application Data

(62) Division of application No. 13/785,483, filed on Mar. 5, 2013, now Pat. No. 9,647,849.

(51) Int. Cl.
| | |
|---|---|
| *H04L 12/775* | (2013.01) |
| *H04L 12/761* | (2013.01) |
| *H04L 12/741* | (2013.01) |
| *H04L 12/18* | (2006.01) |

(52) U.S. Cl.
CPC .......... *H04L 45/58* (2013.01); *H04L 12/1881* (2013.01); *H04L 45/16* (2013.01); *H04L 45/54* (2013.01); *H04L 45/74* (2013.01)

(58) Field of Classification Search
CPC ......... H04L 45/16; H04L 45/54; H04L 45/58; H04L 45/74
See application file for complete search history.

(56) References Cited

U.S. PATENT DOCUMENTS

| | | | |
|---|---|---|---|
| 5,862,345 A | 1/1999 | Okanoue et al. | |
| 7,075,929 B2 | 7/2006 | Korus et al. | |
| 7,630,386 B2 | 12/2009 | Platnic | |
| 7,808,994 B1 * | 10/2010 | Vinokour | H04L 45/52 370/392 |
| 8,023,448 B2 | 9/2011 | Suzuki | |
| 9,647,849 B2 | 5/2017 | Kapadia et al. | |
| 2005/0111474 A1 | 5/2005 | Kobayashi | |
| 2010/0246387 A1 | 9/2010 | Krishnan et al. | |
| 2011/0274114 A1 * | 11/2011 | Dhar | H04L 12/56 370/401 |
| 2011/0299406 A1 * | 12/2011 | Vobbilisetty | H04L 43/0811 370/248 |
| 2012/0014387 A1 | 1/2012 | Dunbar et al. | |

(Continued)

OTHER PUBLICATIONS

Shah et al., "ARP Broadcast Reduction for Large Data Centers," IETF, Oct. 25, 2010, 11 pgs.

(Continued)

*Primary Examiner* — Derrick W Ferris
*Assistant Examiner* — Farhad Ali
(74) *Attorney, Agent, or Firm* — Merchant & Gould P.C.

(57) ABSTRACT

Systems and methods are provided for a multicast based solution to solving the slow-start problem that ensures both optimal (1-hop) and in-sequence delivery of packets to the destination. Packets are hardware switched thereby completely eliminating the slow software switching path.

20 Claims, 10 Drawing Sheets

(56) References Cited

U.S. PATENT DOCUMENTS

2012/0287787 A1* 11/2012 Kamble ................ H04L 49/70
　　　　　　　　　　　　　　　　　　　　　　　370/235
2013/0060962 A1    3/2013  Wang et al.
2013/0242989 A1    9/2013  Bhagavathiperumal et al.
2014/0254589 A1    9/2014  Kapadia et al.

OTHER PUBLICATIONS

Mysore et al., "PortLand: A Scalable Fault-Tolerant Layer 2 Data Center Network Fabric," ACM SIGCOMM, Aug. 2009, 12 pgs.
Edwards et al., "Diverter: A New Approach to Networking Within Virtualized Infrastructures," Proceedings of the 1st ACM Workshop on Research on Enterprise Networking (WREN '09), Aug. 21, 2009, 8 pgs.
Kim et al., "Floodless in SEATTLE: a Scalable Ethernet Architecture for Large Enterprises," SIGCOMM, 2008, 14 pgs.
Scott et al., "Addressing the Scalability of Ethernet with MOOSE," Internet Engineering Task Force, Oct. 18, 2010, 23 pgs.

* cited by examiner

"SLOW-START" PROBLEM IN DATA CENTER NETWORKS AND A POTENTIAL SOLUTION

RELATED APPLICATION

This application is a Division of co-pending U.S. application Ser. No. 13/785,483, now U.S. Pat. No. 9,647,849, entitled ""Slow-Start" Problem in Data Center Networks and a Potential Solution" filed Mar. 5, 2013, which is incorporated herein by reference.

BACKGROUND

In data center environments, be it a service-provider data center, an enterprise data center, or a massively scalable data center ("MSDC"), what is desired is any-to-any communication between a plethora of servers, which may be physical and/or virtual. IP (v4 or v6) has become the defacto standard for these environments. With scalability and mobility (if VMs are used) being the two main problems in these environments, typical architectures being proposed for these environments involve servers attached to top-of-rack ("ToR") switches which are interconnected via a set of spine switches. The specific topology may be a single or multi-tier fat-tree or maybe even something resembling the traditional three level access-aggregation-core framework.

There is common consensus that in environments where the east-to-west server to server traffic is going to dominate, flood/broadcast traffic emanating from Address Resolution Protocol/Neighbor Discovery Protocol ("ARP/ND") should be terminated at the ToR switches with other means to solve the problem of communicating the host address space to all the ToRs. (See e.g., http://tools.ietf.org/html/draft-shah-armd-arp-reduction-01; R. N. Mysore, A. Pamboris, N. Farrington, N. Huang, P. Miri, S. Radhakrishnan, V. Subramanya, A. Vandat, "PortLand: A Scalable Fault-Tolerant Layer 2 Data Center Network Fabric", ACM SIGCOMM, (August 2009); Aled Edwards, Anna Fischer, and Antonio Lain. 2009. Diverter: a new approach to networking within virtualized infrastructures. In Proceedings of the 1st ACM workshop on Research on enterprise networking (WREN '09). ACM, New York, N.Y., USA; C. Kim, M. Caesar, and J. Rexford. Floodless in SEATTLE: a scalable ethernet architecture for large enterprises. In SIGCOMM, 2008).

This could be using a centralized coordinator or directory service as described in the PortLand article cited above which is incorporated in its entirety. Other described centralized coordinators or directory services may also be found in http://tools.ietf.org/html/draft-malc-armd-moose-001-Interfaces (SVIs). Alternatively, Interior Border Gateway Protocol ("iBGP") with Route Reflectors ("RR") may be employed.

Essentially, all these approaches reduce the flood/broadcast traffic due to ARP not only in the fabric but more importantly toward the end-hosts. No matter what approach is taken, when hosts behind a ToR are trying to communicate with remote hosts whether in the same or different subnets, there is an inherent delay at the start before the appropriate remote host entry gets installed in the forwarding information base ("FIB") hardware table before they can start communicating. The delay is due to the fact that the appropriate host entry (/32 for ipv4 and /128 for ipv6) has not been communicated from the remote ToR to the local ToRs (whether using iBGP or the directory service like approach).

In addition, if the table sizes at the ToR fail to accommodate the host entries for all hosts in the data center, not all entries communicated from remote ToRs can be blindly installed in the hardware FIB tables. In that case, only entries of active flows will be maintained at the ToR which requires some software intervention to implement a form of conversational L3 learning. This further adds to the startup delay.

Traditionally, for hosts in the same subnet, the gratuitous ARP requests allow all hosts in that subnet to learn about each other. So hosts in the same subnet can talk to each other without any startup delay. With ARPs being terminated at the ToR, this may be somewhat compromised. Moreover, for hosts in different subnets, typically the subnet prefix entry hit points to the GLEAN adjacency. The packet may be punted to software which subsequently triggers an ARP request for the destination in the directly attached subnet that on resolution results in a host /32 entry being installed in hardware.

While software is performing this ARP resolution for the destination, packets for the flow may be buffered with a tail-drop policy. With the drive towards higher bandwidth pipes to the servers, most of the packets may be dropped since the queue cannot accommodate these large packet bursts. Moreover, even if it could, there could be out-of-order issues since once the entry is installed in hardware, packets hitting the hardware entry are likely to reach the destination host quicker than the buffered packets that will be software switched. So in these cases, software may be better off dropping these packets rather than software switching anything which may also put unnecessary burden on the ToR CPUs.

There is a need for a solution for this "slow-start" problem in data center environments. The present disclosure presents such a solution using IPv4 as an example. It should be noted that similar embodiments would also be effective with IPv6.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Figure 1:
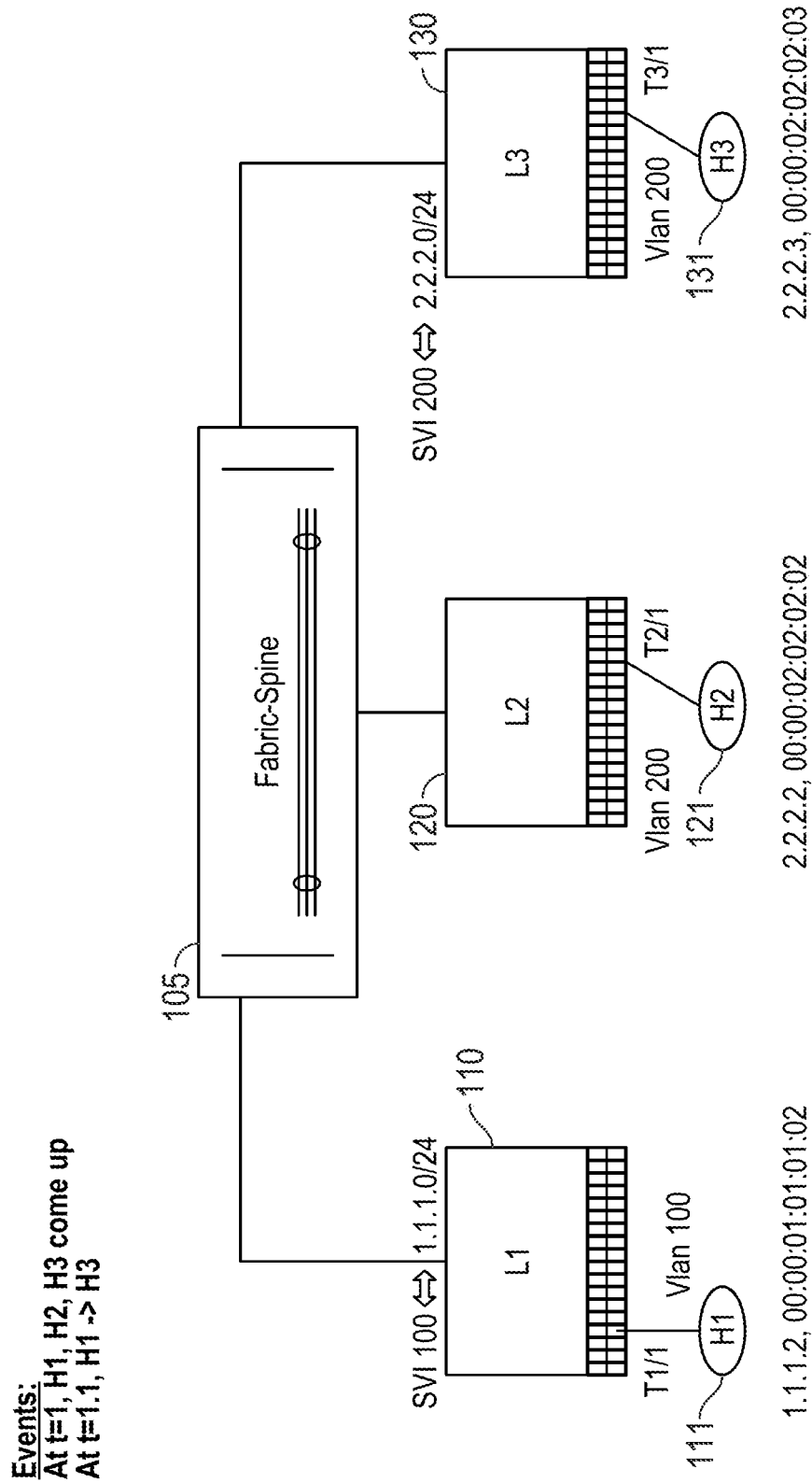
FIGS. 1-7 illustrate an example topology and state of associated tables at certain points in time for embodiments of this disclosure.

Consistent with embodiments of the present disclosure, systems and methods are disclosed for a multicast based solution to solving the slow-start problem that ensures both optimal (1-hop) and in-sequence delivery of packets to the destination. Packets are hardware switched thereby completely eliminating the slow software switching path.

Existing solutions suffer from the inherent "slow-start" problem when communicating with hosts in different subnets. For hosts within the same subnet, the slow-start problem may be addressed using ARP broadcasts which can be undesired especially in data center environments. Embodiments of the present disclosure ensure: (a) Optimal (1-hop through the spine) communication from source to destination; (b) In-sequence delivery with no packet out-of-sequence issues; (c) No burden on ToR CPU to do any form of software switching; and (d) Floods/broadcasts for ARP packets to the end-hosts are eliminated.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

Example Embodiments

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 illustrates an example network environment for embodiments of this disclosure. FIG. 1 shows a sample configuration where a spine 105 is attached to ToR 110, ToR 120, and ToR 130. Hosts, such as host 111, host 121, and host 131, respectively are directly attached to ToR 110, ToR 120, and ToR 130. In this example, for illustration purposes, two subnets exist, where host 111 belongs to subnet 1.1.1.0/24. Host 121 and host 131 belong to subnet 2.2.2.0/24.

Every vlan is associated with a subnet. Software keeps track of ToR membership for a given vlan (and corresponding Switched Virtual Interface (SVI)). The membership information may be programmed in the fabric hardware tables to track the membership associated with the subnet.

In embodiments of the present disclosure, for each subnet, subnet prefixes pointing to a multicast set with remote switches having the subnet may be installed in the ToR hardware tables. Subsequently, when an installed prefix entry is hit, packets may be sent to all remote switches that are part of the set. In some embodiments of the present disclosure, packet replication may be done at an ingress leaf switch. Alternatively, packet replication may occur at spine 105.

A switch may only forward a packet out in the case of a local switch device identifying hit, which may be referred to as the primary-entry. Alternatively, the switch may drop the packet if there is a resultant miss in the FIB table search. In the case where there is an FIB hit for a non-local device, the forwarding of the packet will be blocked. In some embodiments of the present disclosure, the blocking may be executed by an Access Control List ("ACL") rule. Additionally, any packets received from fabric uplinks are not allowed to go back to the fabric.

For dual-homed host devices attached via Distributed EtherChannel ("DEC"), hash value distribution may ensure that only one switch will forward the packet out to the appropriate local DEC member. Software may be employed to ensure that locally DEC-attached hosts are synced across all DEC member switches. In some embodiments, the use of virtual port channels ("vPC" or "vPC+") may be employed to effectuate the syncing process.

The install procedure as described may continue until a remote host address is discovered via iBGP or other database-based protocol approaches. Once the remote host address is discovered, the address may be installed into a FIB table. When subsequent packets arrive and hit the remote host address upon lookup, these subsequent packets will be directly sent to the correct destination leaf-switch.

Embodiments of the present disclosure also provide optimization for multicast groups. It should be noted that the number of multicast groups need not be in the order of subnets. Sharing information is similar between (*, G) and (S, G) trees used in multicast groups. It should be noted that pruning of trees in the multicast group always occurs at the leaf switches so as to ease the burden on the spines.

To optimize the slow start solution for multicast groups, one option may be to create one broadcast group comprising of nothing but leaf switches. However, such a broadcast group may be wasteful as leaf switches will receive unnecessary traffic intended for non-local subnets. Alternatively, one group may be created per each subnet such that the groups only contain leaf switches that have membership in the subnet.

Embodiments of the present disclosure provide for a practical solution between the two previously-described extremes in multicast group optimization. Embodiments start with one group per subnet. Subsequently, wherever possible, embodiments share between subnets comprising the same leaf switch spread. Subnets may be considered to comprise the same leaf switch spread even where leaf membership per subnet is not exactly the same. As a result, the number of multicast group entries needed may be greatly reduced.

In some embodiments, a threshold number of leaves may be determined over which a subnet spans. When a particular subnet spans more than the predetermined threshold number of leaves, the replication of packets at the spine may prove to be more efficient.

Figure 2:
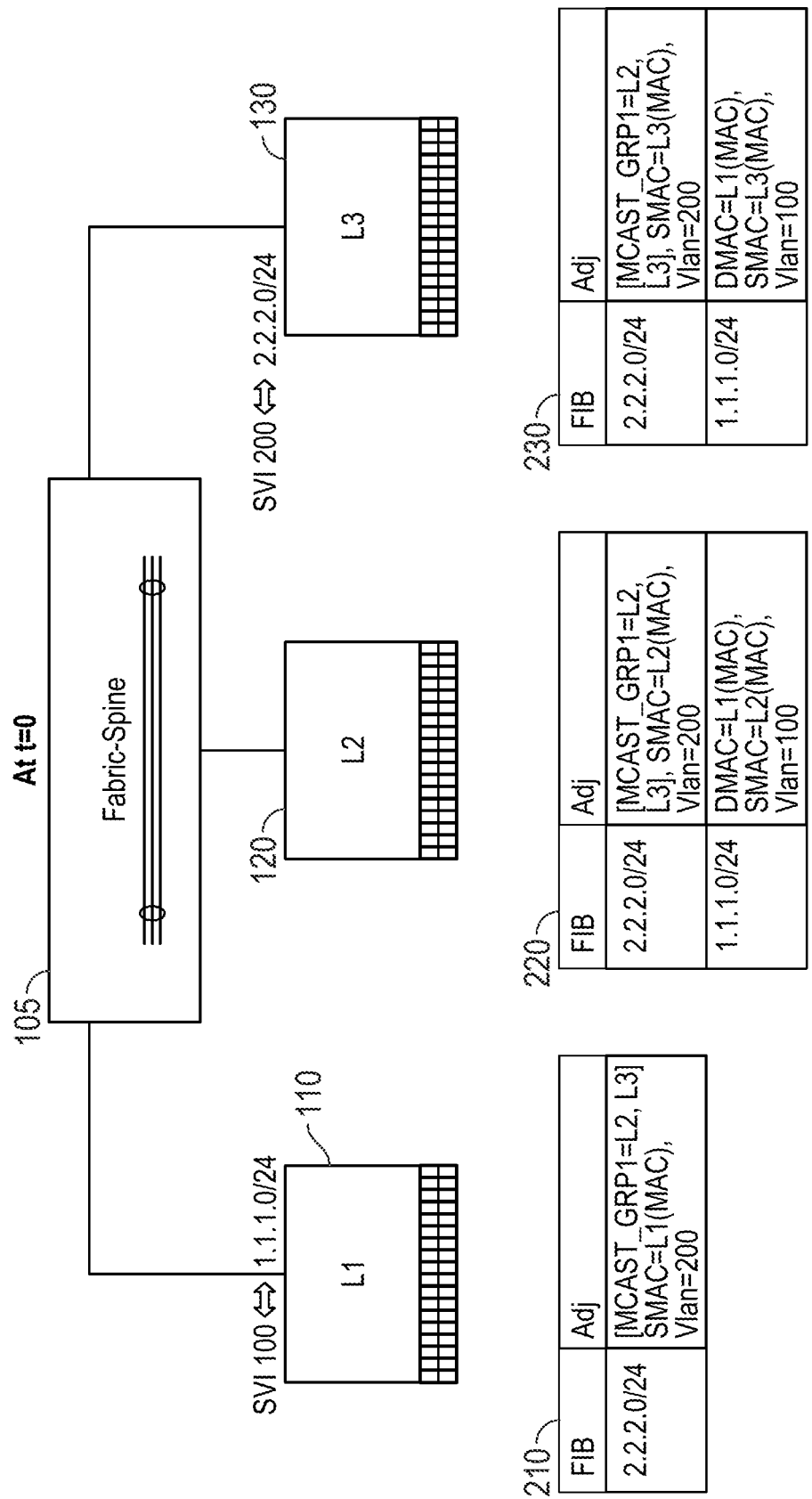

FIG. 2 shows the relevant forwarding hardware table programming on ToR 110, ToR 120, and ToR 130 at a time=0. For a given vlan, a "local" ToR refers to a ToR that has at least one port in that vlan else it is called a "nonlocal" ToR. Recall that the terms vlan and subnet are used interchangeably. FIB table 210 may be associated with ToR 110. FIB table 210 has an address entry of 2.2.2.0/24 which when hit corresponds to a multicast group destination that includes ToR 120 and ToR 130 located on vlan=200.

ToR 120 has an associated FIB table 220 containing two entries. The first address entry for 2.2.2.0/24 may point to the Multicast MAC address associated with vlan 200. The second address entry for 1.1.1.0/24 may point to the MAC address of ToR 110 located on vlan=100 since vlan 100 is localized to ToR 110.

Similarly, ToR 130 has an associated FIB table 230 containing two entries. The first address entry for 2.2.2.0/24 may point to the Multicast MAC address associated with vlan 200. The second address entry for 1.1.1.0/24 may point to the MAC address of ToR 110 located on vlan=100.

Figure 3:
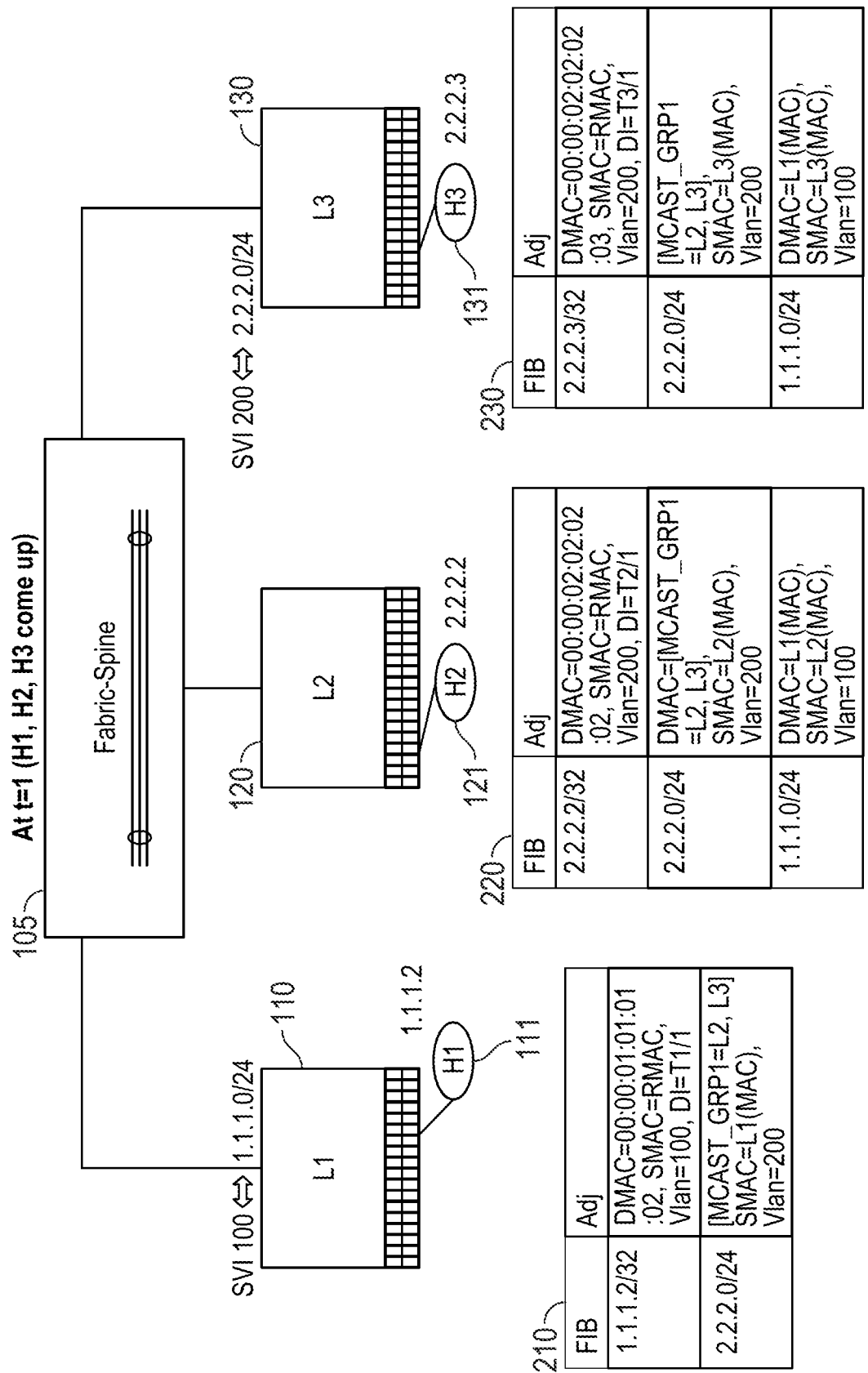

FIG. 3 illustrates the example topology at time=1. At time=1, host 111, host 121, and host 131 may all come online. Each of host 111, host 121, and host 131 has an associated address. These associated addresses may be added to the respective FIB tables. A new entry is subsequently added to FIB table 210 indicating host 111 address 1.1.1.2/32 is directly attached to ToR 110. Similar entries are installed in FIB table 220 and FIB table 230 indicating the presence of host device 121 and host device 131 respectively.

Figure 4:
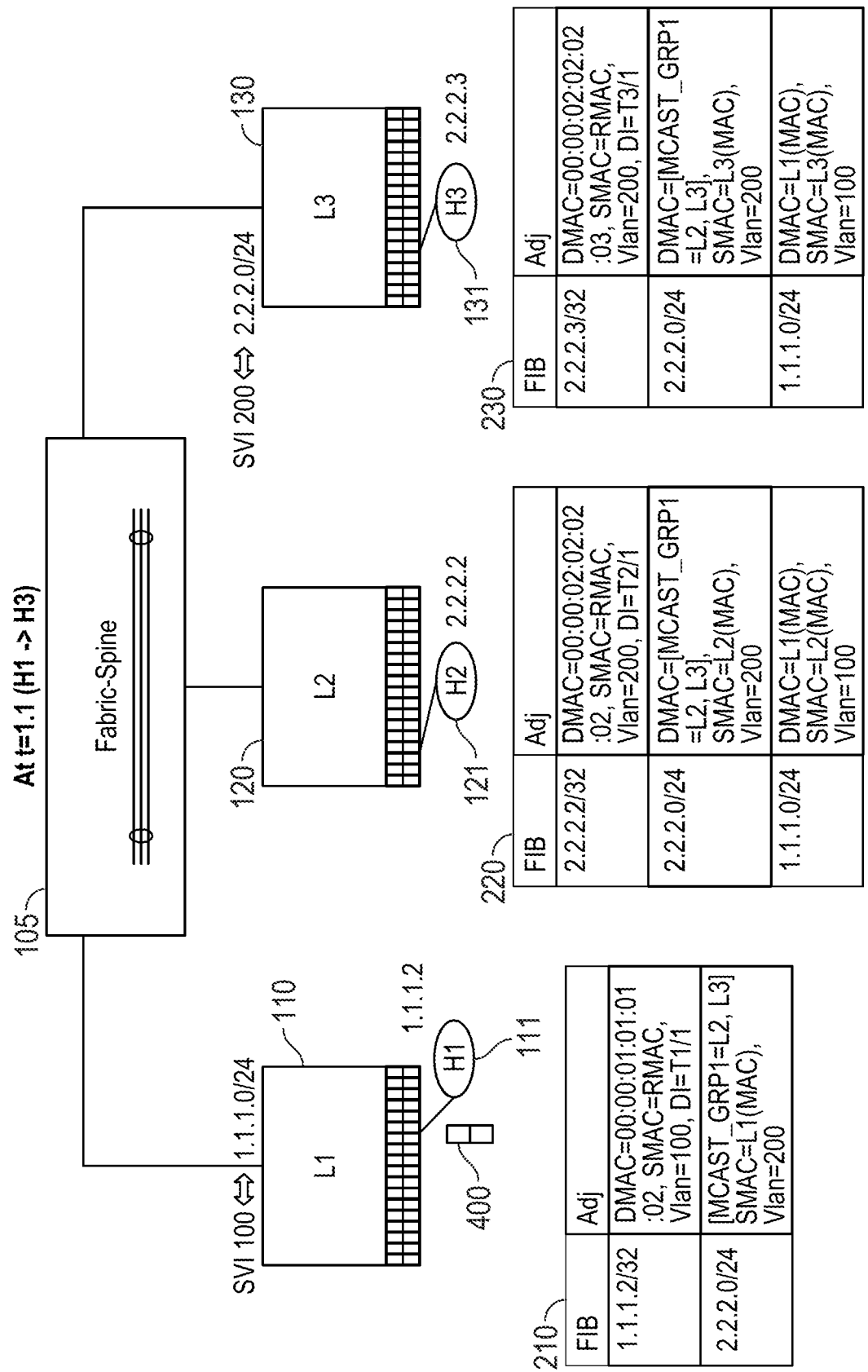
Figure 5:
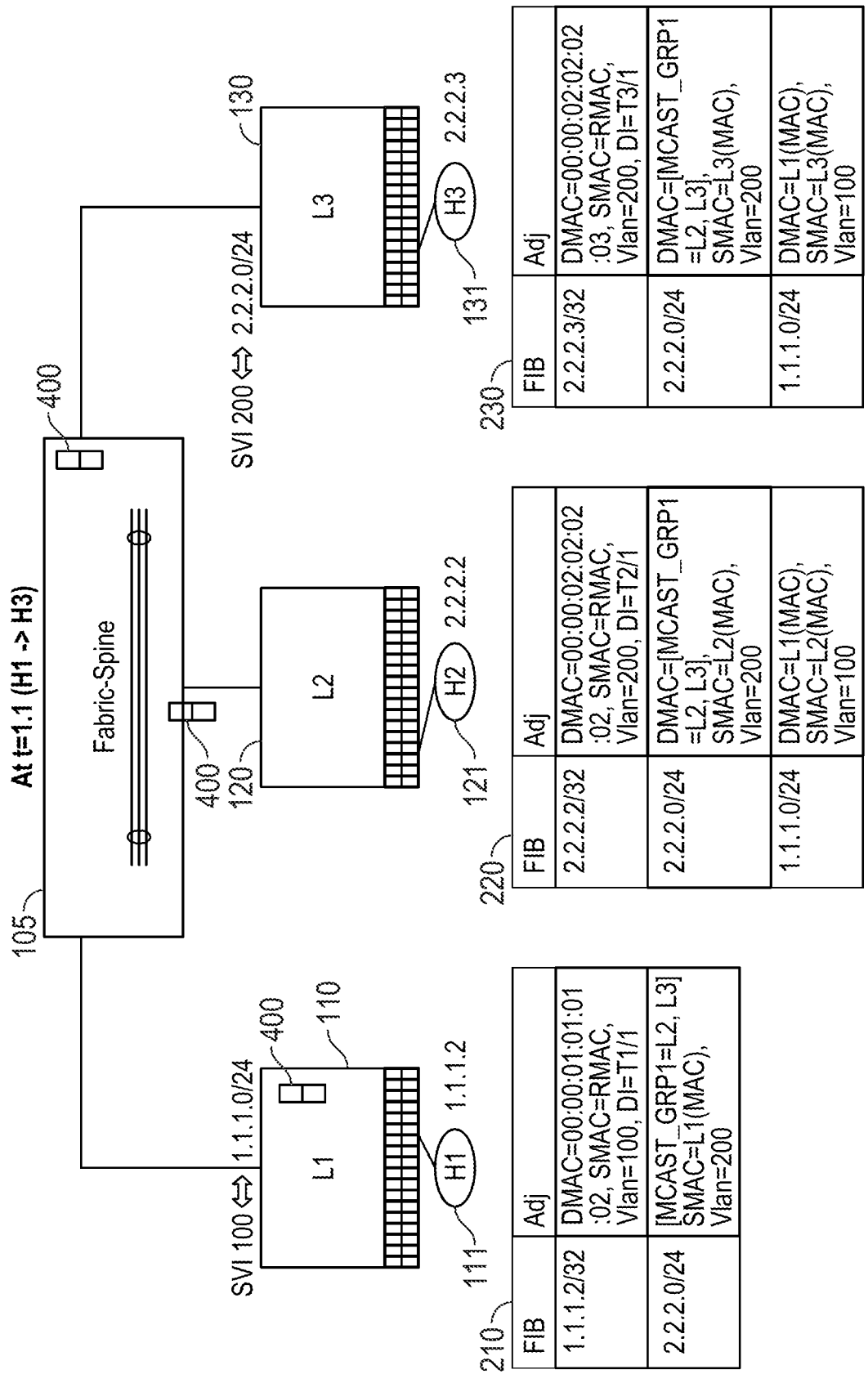

FIG. 4 illustrates the example topology at time=1.1. At time=1.1, host 111 may receive a packet 400 which is destined for host 131. FIG. 5 illustrates the topology as packet 400 traverses to ToR 110 and subsequently replicated at spine 105 for delivery to ToR 120 and ToR 130 respectively.

Figure 6:
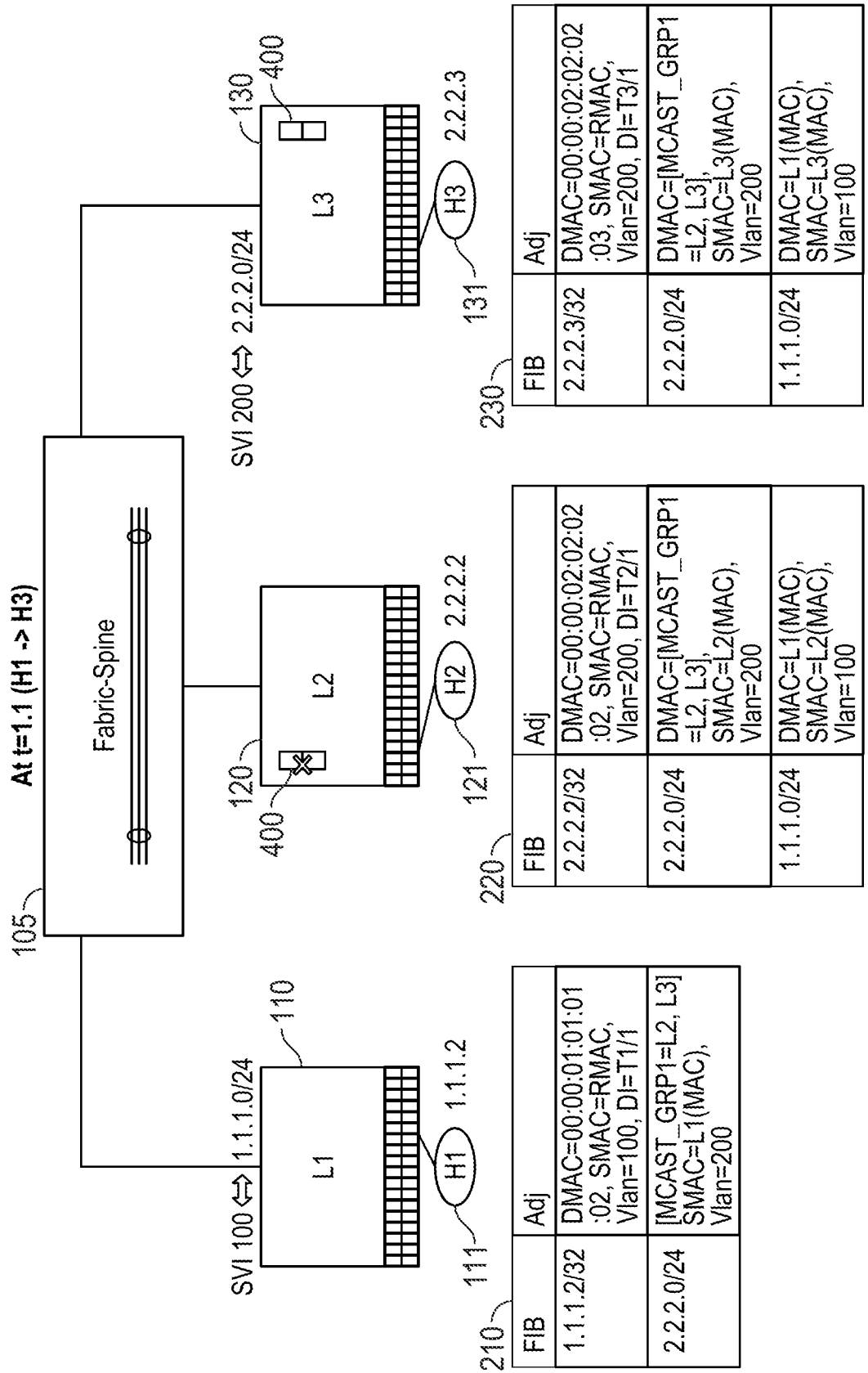

FIG. 6 illustrates that ToR 120 receives packet 400 and subsequently drops the packet as there is no match within FIB table 220. The packet is not allowed to go back to spine 105. However, packet 400 is a hit at FIB table 230 associated with ToR 130. Upon the local hit, the packet is appropriately forwarded out by ToR 130 to host 131.

Figure 7:
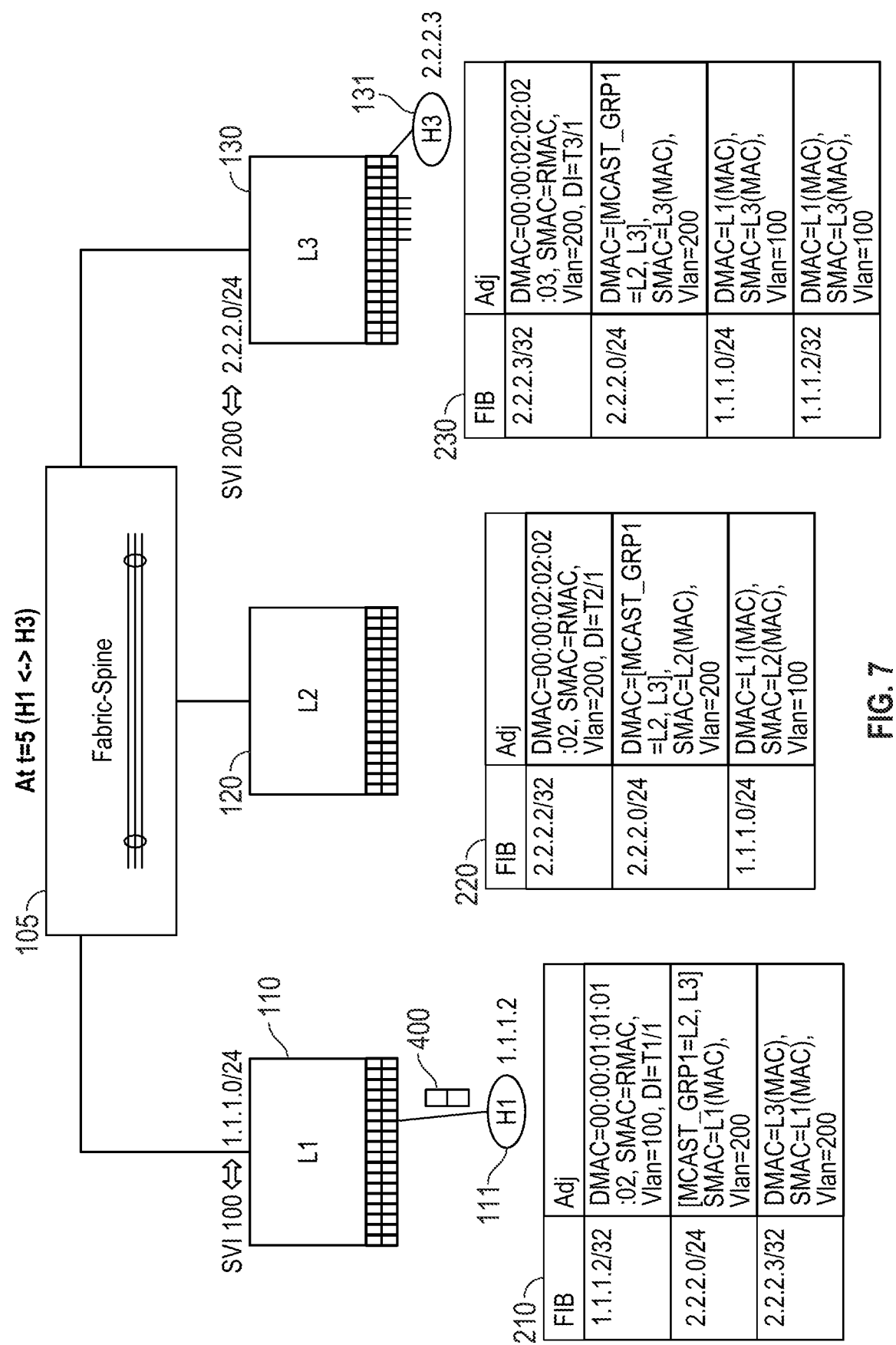

FIG. 7 illustrates the example topology at time=5 where all the end-host information (in this example that of host 111, 121, and 131) has been disseminated to all the ToRs. The presence of an active bidirectional flow will ensure that the ToRs will update their hardware FIB tables with the respective remote host entries. FIG. 7 shows the state after FIB table 210 and FIB table 230 have been updated such that host device 111 and host device 131 have been learnt. The updated FIB tables illustrate the learned direct connection paths.

Certain embodiments of the present disclosure may be able to handle the scenario where a host attempts to talk to another host that has gone down and not returned or was non-existent to begin with. Previously in this scenario, the subnet prefix entry may be hit and the packets will continue to be sent to the remote switches where they will be summarily dropped.

In present embodiments, whenever a subnet prefix is hit for a new data flow, a packet may be leaked to the CPU of the switch device. Control plane policing may be implemented to rate-limit the number of packets that are leaked to the CPU. It should be understood that software may appropriately handle duplicate packets within the same data flow.

Software may also keep track of each of the new flow with a unique DIP (Destination IP address) where there is no current address entry in the FIB. The software may associate a timer with each such DIP. As such, a configurable timeout value may be set so it may be determined whether a particular host device is available.

If and when the address entry is later learned via iBGP or other data center protocols, it may be understood that the associated host device is active and the configurable timer may be reset. In the case where the timer expires, the address associated with the downed or non-existent host device may be installed into the FIB table along with an indicator that the host is set for DROP. After an active host eventually comes up, the address entry may be updated to indicate that the entry associated with DROP be updated to the newly located correct destination leaf switch.

Figure 8:
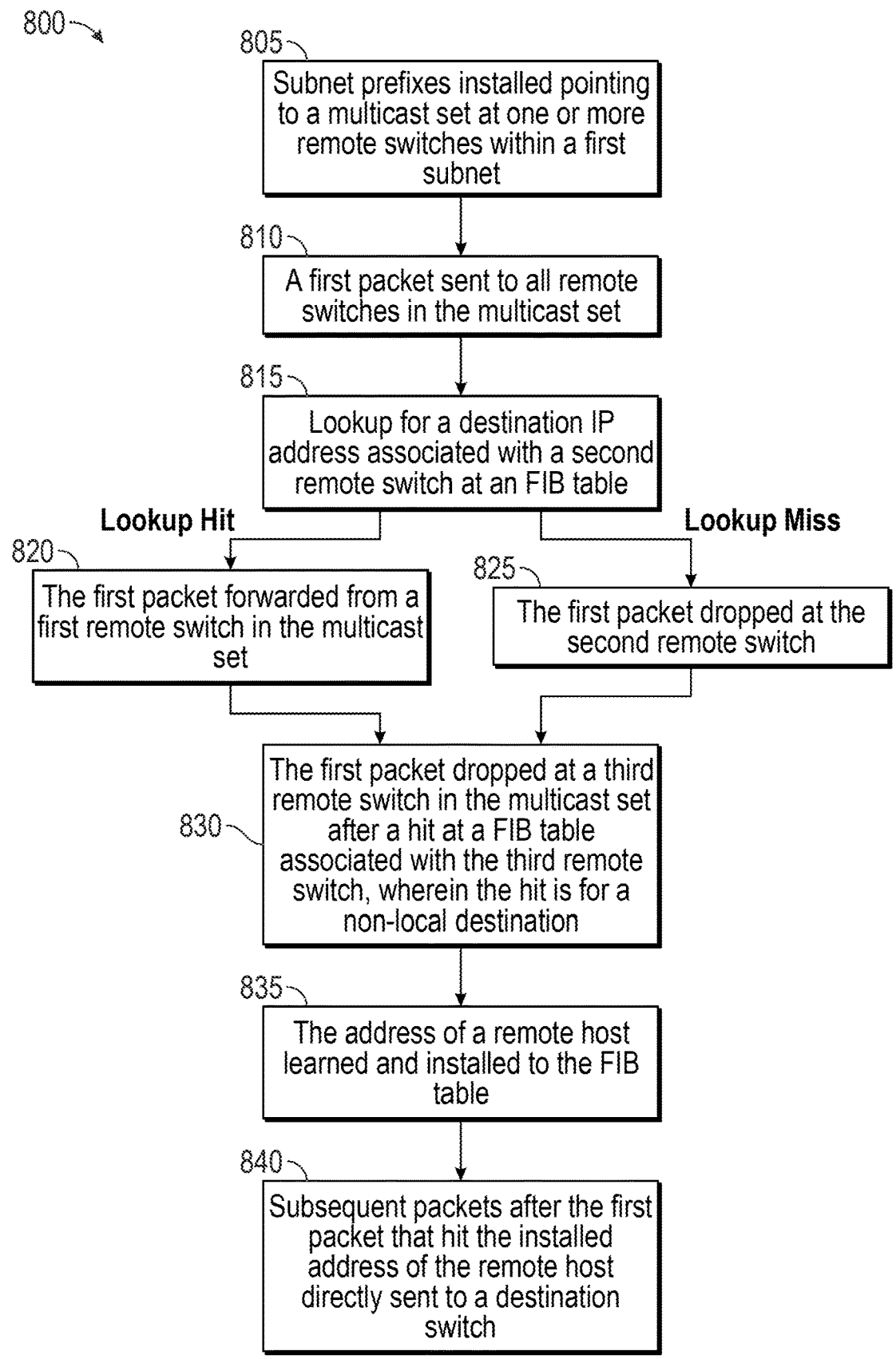
FIG. 8 is a flow chart illustrating embodiments of this disclosure.

FIG. 8 is a flow chart illustrating embodiments of the present disclosure. Method 800 may begin at step 805. At step 805, one or more subnet prefixes may be installed pointing to a multicast set at one or more remote switches within a first subnet. In some embodiments of the present disclosure, the number of multicast groups in the multicast set may not be in the order of the number of subnets.

Next, at step 810, a first packet may be sent to all remote switches in the multicast set. In some embodiments, this and other packets may be replicated at an ingress leaf device (terms leaf and ToR are used interchangeably). Alternatively, packets may be replicated at a spine device. Subsequently, at step 815, a lookup may occur for a destination IP address associated with a second remote switch at an FIB table. If the lookup results in a hit, method 800 may proceed to step 820 where the first packet may be forwarded from a first remote switch in the multicast set. If the lookup results in a miss, method 800 may proceed to step 825 where the first packet may be dropped at the second remote switch. In some embodiments of the present disclosure the first remote switch and the second remote switch may reside on one of an IPv4 network or an IPv6 network.

In some embodiments, method 800 may proceed to step 830. At step 830, the first packet may be dropped at a third remote switch in the multicast set after a hit at a FIB table associated with the third remote switch, wherein the hit is for a non-local destination. In some embodiments of the present disclosure, the first packet may be blocked from returning to the network spine. Such blocking may be implemented by an ACL rule.

Method 800 may next proceed to step 835. At step 835, the address of a remote host may be learned and may be installed to the FIB table. In some embodiments of the present disclosure, the address of the remote host may be learned via iBGP. As such, method 800 may proceed to step 840, where subsequent packets after the first packet that hit the installed address of the remote host may be directly sent to a destination switch.

Figure 9:
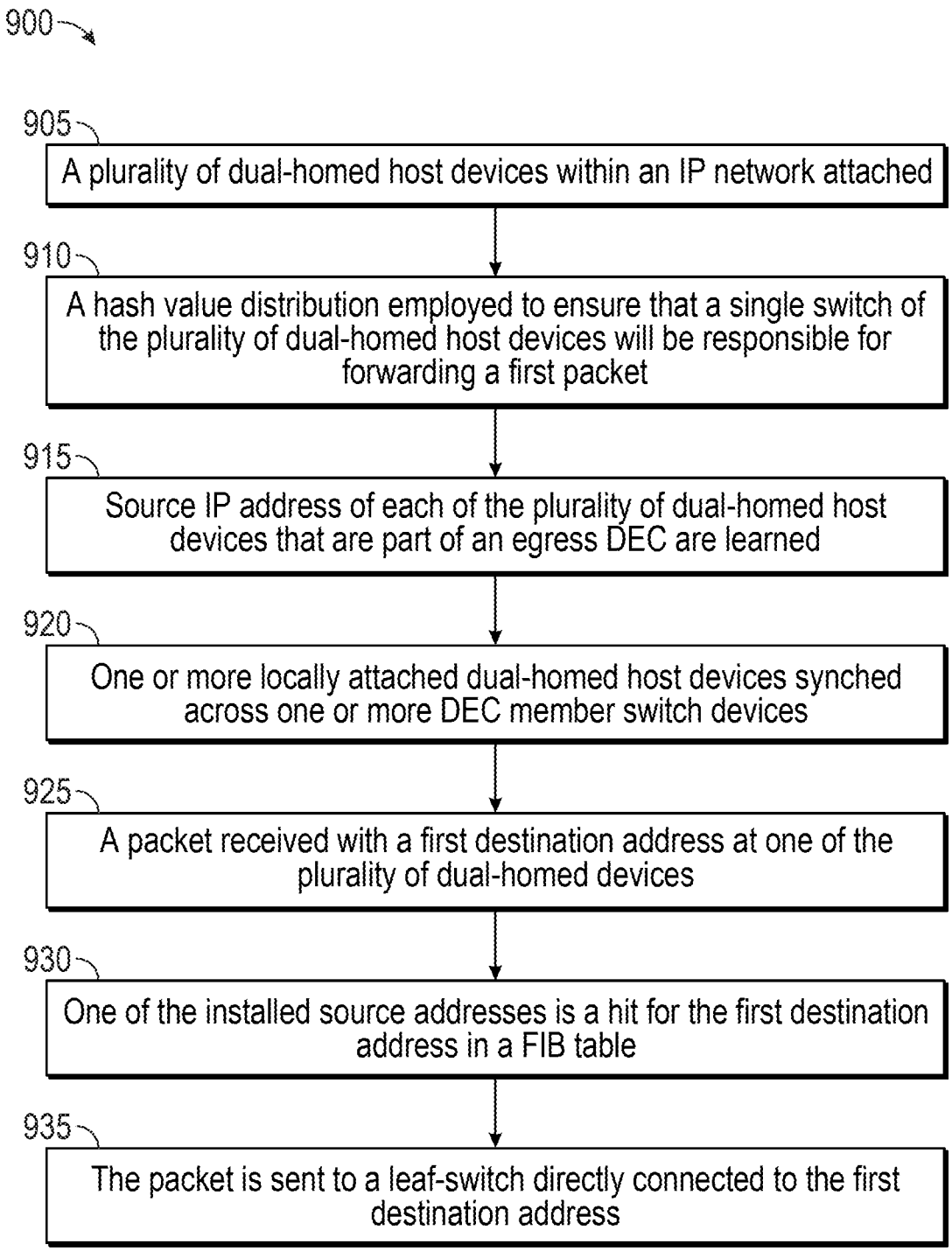
FIG. 9 is a flow chart illustrating embodiments of this disclosure.

FIG. 9 is a flowchart illustrating embodiments of the present disclosure. Method 900 may begin at step 905 where a plurality of dual-homed host devices within an IP network may be attached. The locally attached dual-homed host devices may be synched using VPC or VPC+.

Next, at step 910, a hash value distribution may be employed to ensure that a single switch of the plurality of dual-homed host devices will be responsible for forwarding a first packet received from the spine.

Method 900 may then proceed to step 915. At step 915, source IP address of each of the plurality of dual-homed host devices that are part of an egress DEC may be learned. The learned source IP addresses may then subsequently installed to a FIB table.

Subsequently, at step 920, one or more locally attached dual-homed host devices may be synched across one or more DEC member switch devices. At step 925, a packet may be received with a first destination address at one of the plurality of dual-homed devices. After receipt of the packet, method 900 may proceed to step 930 wherein one of the installed source addresses is a hit for the first destination address in a FIB table.

After the FIB table hit, method 900 may proceed to step 935. At step 935, the packet may be sent to a leaf-switch directly connected to the first destination address.

Figure 10:
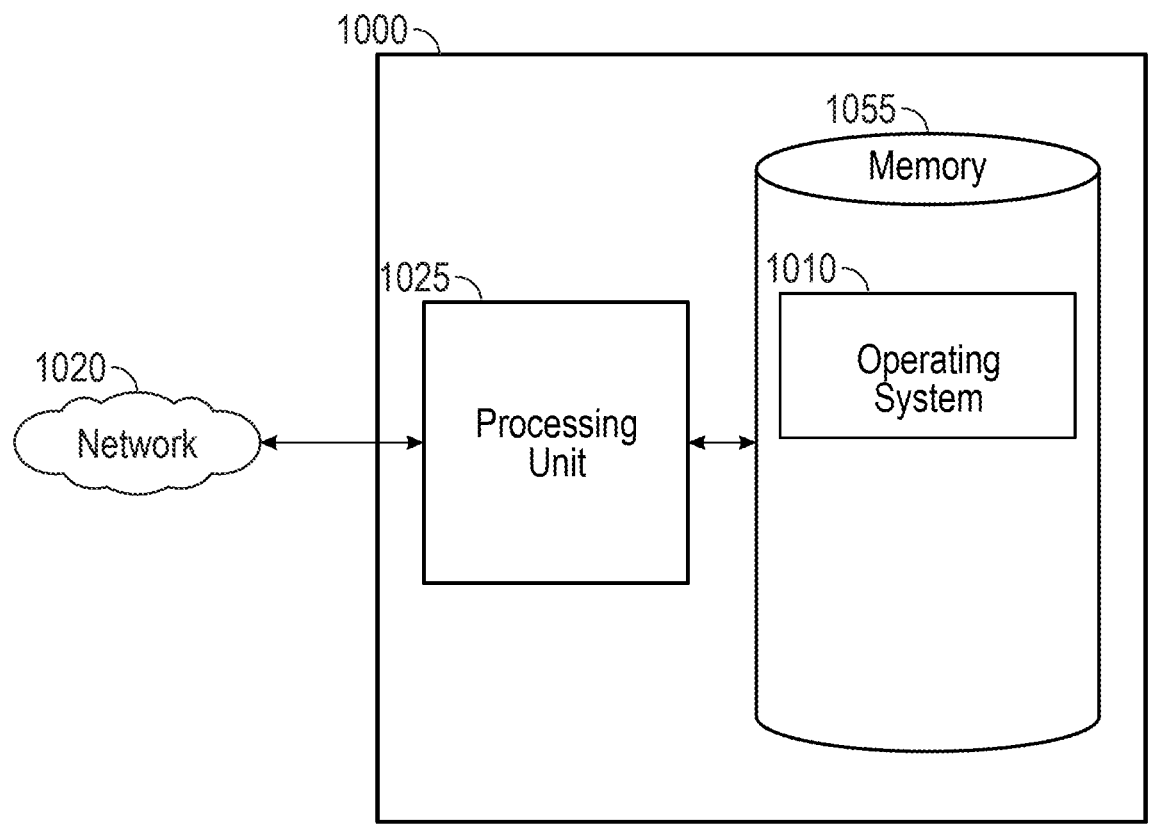
FIG. 10 is a block diagram of a computing network device.

FIG. 10 illustrates a computing device 1000, such as a server, host, or other network devices described in the present specification. Computing device 1000 may include processing unit 1025 and memory 1055. Memory 1055 may include software configured to execute application modules such as an operating system 1010. Computing device 1000 may execute, for example, one or more stages included in the methods as described above. Moreover, any one or more of the stages included in the above describe methods may be performed on any element shown in FIG. 10.

Computing device 1000 may be implemented using a personal computer, a network computer, a mainframe, a computing appliance, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose. While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method comprising:
   attaching a plurality of dual-homed host devices within an Internet Protocol (IP) network;
   employing a hash value distribution to ensure that a single switch of the plurality of dual-homed host devices will be responsible for forwarding a first packet;
   learning source IP address of each of the plurality of dual-homed host devices that are part of an egress Distributed EtherChannel (DEC);
   installing one or more learned source IP addresses to a first forwarding information base (FIB) table;
   syncing one or more locally attached dual-homed host devices across one or more DEC member switch devices;
   receiving a packet with a first destination address at one of the plurality of dual-homed devices;
   sending, in response to hitting a FIB entry in the first FIB table, the packet to a first leaf-switch directly connected to the first destination address;
   dropping the packet at the first leaf-switch after a miss at a second FIB table associated with the leaf-switch; and
   dropping the packet at a second leaf-switch after a hit at a third FIB table associated with the second leaf-switch, wherein the hit is for a non-local destination.

2. The method of claim 1, wherein the one or more locally attached dual-homed host devices are synched using virtual port channels (VPC).

3. The method of claim 1, wherein the one or more locally attached dual-homed host devices are synched using virtual port channels (VPC)+.

4. The method of claim 1, further comprising learning source IP addresses from one or more databases.

5. The method of claim 1, further comprising replicating packets at the one of the plurality of dual-homed devices.

6. The method of claim 1, further comprising replicating packets at a network spine associated with the one of the plurality of dual-homed devices.

7. The method of claim 6, further comprising blocking the packet from returning to the spine.

8. The method of claim 7, wherein the blocking is implemented by an Access Control List (ACL) rule.

9. The method of claim 1, wherein the first leaf-switch and the second leaf-switch reside on one of an Internet Protocol version 4 (IPv4) network or an Internet Protocol version 6 (IPv6) network.

10. A non-transitory computer-readable medium that stores a set of instructions which when executed perform a method comprising:
    attaching a plurality of dual-homed host devices within an Internet Protocol (IP) network;
    employing a hash value distribution to ensure that a single switch of the plurality of dual-homed host devices will be responsible for forwarding a first packet;
    learning source IP address of each of the plurality of dual-homed host devices that are part of an egress Distributed EtherChannel (DEC);
    installing one or more learned source IP addresses to a first forwarding information base (FIB) table;
    syncing one or more locally attached dual-homed host devices across one or more DEC member switch devices;
    receiving a packet with a first destination address at one of the plurality of dual-homed devices;
    sending, in response to hitting the FIB entry in the first FIB table, the packet to a first leaf-switch directly connected to the first destination address;
    dropping the packet at the first leaf-switch after a miss at a second FIB table associated with the first leaf-switch; and
    dropping the packet at a second leaf-switch after a hit at a second FIB table associated with the second leaf-switch, wherein the hit is for a non-local destination.

11. The non-transitory computer-readable medium of claim 10, wherein the one or more locally attached dual-homed host devices are synched using virtual port channels (VPC).

12. The non-transitory computer-readable medium of claim 10, wherein the one or more locally attached dual-homed host devices are synched using virtual port channels (VPC)+.

13. The non-transitory computer-readable medium of claim 10, further comprising learning source IP addresses from one or more databases.

14. A system comprising:
    a memory storage; and
    a processing unit coupled to the memory storage, wherein the processing unit is operative to:
        employ a hash value distribution to ensure that a single switch of a plurality of dual-homed host devices will be responsible for forwarding a first packet, the plurality of dual-homed host devices being attached within an Internet Protocol (IP) network;

learn source IP address of each of the plurality of dual-homed host devices that are part of an egress Distributed EtherChannel (DEC);

install one or more learned source IP addresses to a first forwarding information base (FIB) table;

sync one or more locally attached dual-homed host devices across one or more DEC member switch devices;

receive a packet with a first destination address at one of the plurality of dual-homed devices;

send, in response to hitting the FIB entry in the first FIB table, the packet to a first leaf-switch directly connected to the first destination address;

drop the packet at the first leaf-switch after a miss at a second FIB table associated with the first leaf-switch; and drop the packet at a second leaf-switch after a hit at a third FIB table associated with the second leaf-switch, wherein the hit is for a non-local destination.

15. The system of claim 14, wherein the one or more locally attached dual-homed host devices are synched using virtual port channels (VPC).

16. The system of claim 14, wherein the one or more locally attached dual-homed host devices are synched using virtual port channels (VPC)+.

17. The system of claim 14, wherein the processing unit is further operative to learn source IP addresses from one or more databases.

18. The system of claim 14, wherein the first leaf-switch and the second leaf-switch reside on one of an Internet Protocol version 4 (IPv4) network or an Internet Protocol version 6 (IPv6) network.

19. The system of claim 14, wherein the one of the plurality of dual-homed devices is configured to replicate packets.

20. The system of claim 14, further comprising a network spine configured to replicate packets.

* * * * *